US011233911B2

United States Patent
Homma et al.

(10) Patent No.: US 11,233,911 B2
(45) Date of Patent: Jan. 25, 2022

(54) IMAGE PROCESSING APPARATUS AND NON-TRANSITORY COMPUTER READABLE MEDIUM FOR IMAGE PROCESSING

(71) Applicant: FUJIFILM Business Innovation Corp., Tokyo (JP)

(72) Inventors: Naoki Homma, Yokohama (JP); Atsuya Baba, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 164 days.

(21) Appl. No.: 16/125,814

(22) Filed: Sep. 10, 2018

(65) Prior Publication Data

US 2019/0098144 A1    Mar. 28, 2019

(30) Foreign Application Priority Data

Sep. 27, 2017  (JP) .............................. JP2017-185699

(51) Int. Cl.
*H04N 1/00* (2006.01)
*H04N 1/387* (2006.01)
*G06F 3/12* (2006.01)

(52) U.S. Cl.
CPC ....... *H04N 1/0044* (2013.01); *H04N 1/00469* (2013.01); *H04N 1/3873* (2013.01); *H04N 1/3877* (2013.01)

(58) Field of Classification Search
CPC ............ H04N 1/0044; H04N 1/00469; H04N 1/3873; H04N 1/3877; G06F 3/1208; G06F 3/1256

USPC ........................ 358/1.11–1.18, 527, 400–404
See application file for complete search history.

(56) References Cited

U.S. PATENT DOCUMENTS

| | | | | |
|---|---|---|---|---|
| 5,179,649 A | * | 1/1993 | Masuzaki | G06K 9/3216 715/224 |
| 6,137,905 A | * | 10/2000 | Takaoka | G06K 9/3208 382/173 |
| 6,360,011 B1 | * | 3/2002 | Katsumata | G06K 9/00449 382/181 |
| 2002/0154818 A1 | | 10/2002 | Najman et al. | |
| 2008/0309957 A1 | * | 12/2008 | Horiuchi | G06K 9/3208 358/1.9 |
| 2009/0016647 A1 | * | 1/2009 | Hamaguchi | G06K 9/00463 382/305 |

(Continued)

FOREIGN PATENT DOCUMENTS

| | | |
|---|---|---|
| JP | H07-093348 | 4/1995 |
| JP | 2002-279434 | 9/2002 |

(Continued)

OTHER PUBLICATIONS

Abstract and machine translation of JP 2016-48965.

(Continued)

*Primary Examiner* — Chad Dickerson
(74) *Attorney, Agent, or Firm* — Fildes & Outland, P.C.

(57) ABSTRACT

There is provided an image processing apparatus. A generating unit that generates preview image data representing a document read by a reading unit. A display controller that controls a display such that the display displays a partial image which is an image represented by the preview image data and is positioned in a specific area which is a predetermined partial area, as an upright image.

15 Claims, 12 Drawing Sheets

(56) References Cited

U.S. PATENT DOCUMENTS

| | | | | |
|---|---|---|---|---|
| 2012/0133980 A1* | 5/2012 | Harada | ................ | G06F 3/1208 |
| | | | | 358/1.15 |
| 2012/0250078 A1* | 10/2012 | Yamada | ............ | G03G 15/5087 |
| | | | | 358/1.15 |
| 2013/0021633 A1 | 1/2013 | Atsumi et al. | | |
| 2013/0212525 A1* | 8/2013 | Shogaki | ................ | G06F 3/0483 |
| | | | | 715/799 |

FOREIGN PATENT DOCUMENTS

| | | |
|---|---|---|
| JP | 2006-262071 | 9/2006 |
| JP | 2009-021712 | 1/2009 |
| JP | 2013-026720 | 2/2013 |
| JP | 2016-48965 | 4/2016 |
| JP | 2016048965 A * | 4/2016 |

OTHER PUBLICATIONS

Office Action dated Jun. 1, 2021 in corresponding Japanese application No. 2017-185699 and English Translation.
English language machine translation of JP2006-262071.

* cited by examiner

FIG. 12

IMAGE PROCESSING APPARATUS AND NON-TRANSITORY COMPUTER READABLE MEDIUM FOR IMAGE PROCESSING

CROSS-REFERENCE TO RELATED APPLICATIONS

This application is based on and claims priority under 35 USC 119 from Japanese Patent Application No. 2017-185699 filed Sep. 27, 2017.

BACKGROUND

The present disclosure related to an image processing apparatus and a non-transitory computer readable medium.

SUMMARY

According to an aspect of the invention, there is provided an image processing apparatus includes a generating unit that generates preview image data representing a document read by a reading unit and a display controller that controls a display such that the display displays a partial image which is an image represented by the preview image data and is positioned in a specific area which is a predetermined partial area, as an upright image.

BRIEF DESCRIPTION OF THE DRAWINGS

Exemplary embodiment(s) of the present invention will be described in detail based on the following figures, wherein:

FIG. 12 is a view illustrating the positions of title sections.

DETAILED DESCRIPTION

[1] Configuration

Figure 1:
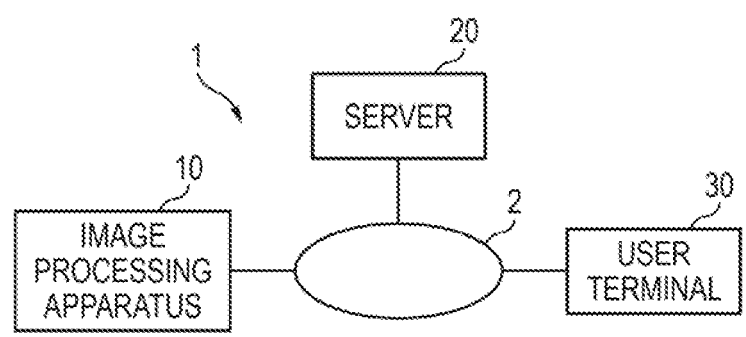
FIG. 1 is a view illustrating the configuration of an image processing system.

FIG. 1 is a block diagram illustrating the configuration of an image processing system 1 according to an exemplary embodiment. The image processing system 1 includes an image processing apparatus 10, a server 20, and a user terminal 30. The image processing apparatus 10 performs image processing such as an image forming process of forming images on media such as paper and an image reading process of reading images formed on media such as documents. The server 20 provides various services such as a storage service. The user terminal 30 is, for example, a smart phone, a tablet terminal, or a notebook type PC (Personal Computer). The image processing apparatus 10 is connected to the server 20 and the user terminal 30 by a communication line 2. The communication line 2 includes at least one of the Internet, a mobile communication network, a phone line, a local area network (LAN), and so on.

In the present exemplary embodiment, the user terminal 30 also functions as a display for displaying various screens of the image processing apparatus 10 such as a menu screen and preview screens. In the case where the user terminal 30 is used as a display of the image processing apparatus 10, the image processing apparatus 10 transmits data representing the menu screen, preview screens, and so on to the user terminal 30, and the user terminal 30 displays a variety of information on the menu screen, the preview screens, and so on according to the data received from the image processing apparatus 10, on a display panel of the user terminal.

Figure 2:
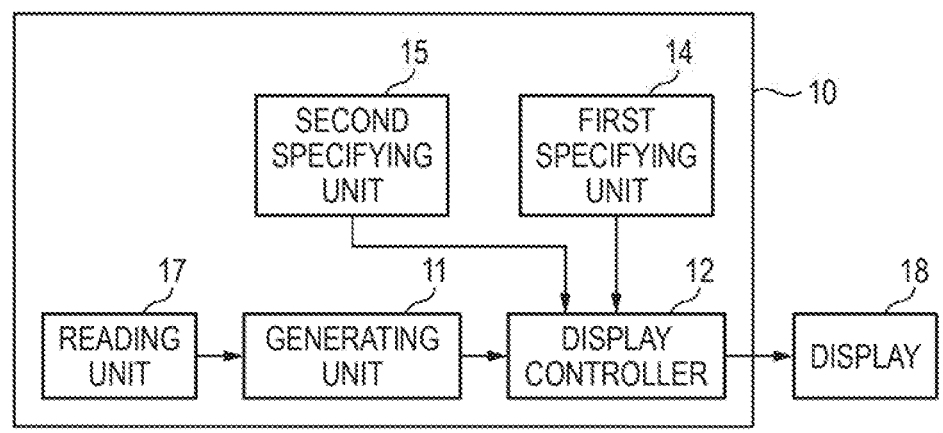
FIG. 2 is a view illustrating the functional configuration of the image processing system.

FIG. 2 is a block diagram illustrating the functional configuration of the image processing system 1. In FIG. 2, a generating unit 11 generates preview image data representing a document read by a reading unit 17. A display controller 12 controls a display 18 such that the display displays, as au upright image, a partial image which is a part of an image represented by the generated preview image data and is in a specific area which is a predetermined partial area. In the present exemplary embodiment, the term "upright image" means an image which is displayed such that its vertical direction is arranged in a correct direction (such a direction that characters and the image are not inverted), in other words, an image which is not inverted in the vertical direction (the left-right direction).

Also, in the case where an instruction to rotate the image is given, the display controller 12 specifies a partial image which is a part of an image obtained by rotating the image represented by the preview image data generated by the generating unit 11 180 degrees and is positioned in the specific area, and controls the display 18 such that the display displays the specified partial image.

A first specifying unit 14 specifies at least one of the size and standard of the read document, as an attribute of the corresponding document. A second specifying unit 15 performs image analysis on the preview image data, and specifies a rectangular area satisfying a predetermined condition, according to the analysis result.

Figure 3:
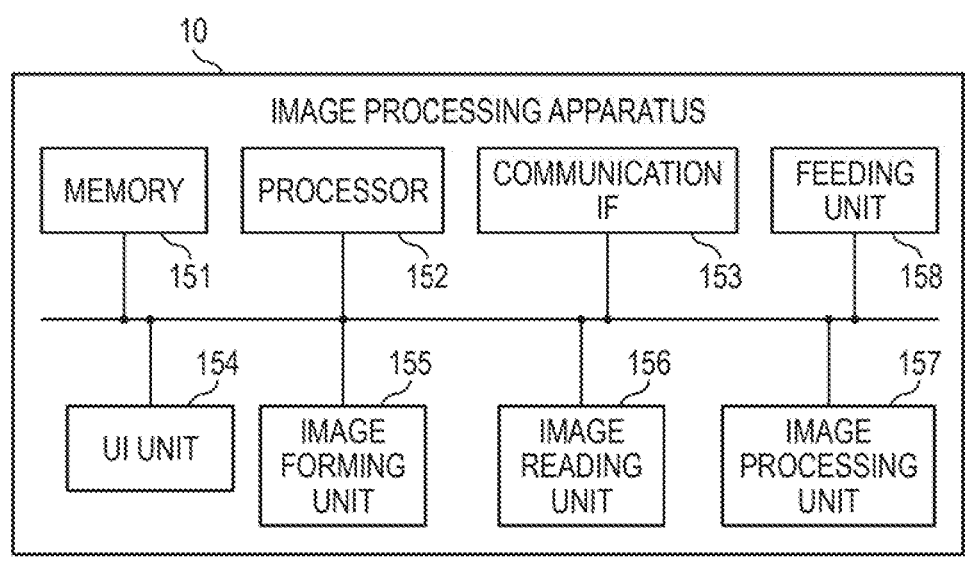
FIG. 3 is a view illustrating the hardware configuration of an image processing apparatus.

FIG. 3 is a view illustrating the hardware configuration of the image processing apparatus 10. In FIG. 3, a memory 151 is for storing a variety of data. A processor 152 performs data processing according to programs stored in the memory 151. A communication IF 153 is an interface for performing data communication with external devices via a network. An UI unit 154 has, for example, a touch screen and keys. An image forming unit 155 forms images on media such as paper in an electrophotographic way. The UI unit 154 may be installed in the image processing apparatus 10, or may be attached to the outside of the image processing apparatus and is externally connected to the image processing apparatus. An image reading unit 156 optically reads images of documents (media). An image processing unit 157 has, for example, a digital signal processor (DSP) and a graphics processing unit (GPU), and performs a variety of image processing. A feeding unit 158 feeds media such as paper to the image forming unit 155.

In this example, at least one of the processor 152 and the image processing unit 157 executes the programs stored in the memory 151, whereby the functions shown in FIG. 2 are implemented. At least one of the processor 152 and the image processing unit 157 which is executing the programs is examples of the generating unit 11, the display controller 12, the first specifying unit 14, and the second specifying unit 15. The image reading unit 156 is an example of the reading unit 17. The UI unit 154 is an example of the display 18.

Figure 4:
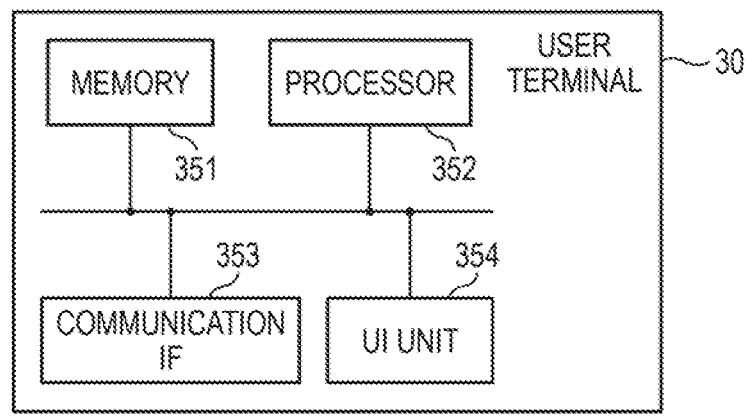
FIG. 4 is a view illustrating the hardware configuration of a user terminal.

FIG. 4 is a view illustrating the hardware configuration of the user terminal 30. In FIG. 4, a memory 351 is for storing a variety of data. A processor 352 performs data processing according to programs stored in the memory 351. A communication IF 353 is an interface for performing data communication with external devices via the communication line 2. An UI unit 354 has, for example, a touch screen and keys.

[2] Operation

A user sets a document in a longitudinal direction or a transverse direction on the image processing apparatus 10, and gives an instruction to perform a scanning process by pushing a start button of the UI unit 154 or the UI unit 354. In the present exemplary embodiment, the case where the document is in the longitudinal direction means the case where the length of the read object document in a conveyance direction is longer than the length of the corresponding document in a direction perpendicular to the conveyance direction. Also, the case where the document is in the transverse direction means the case where the length of the read object document in the conveyance direction is shorter than the length of the corresponding document in the direction perpendicular to the conveyance direction. If the start button of the UI unit 154 or the UI unit 354 is pushed, the process of scanning the document is started.

Figure 5:
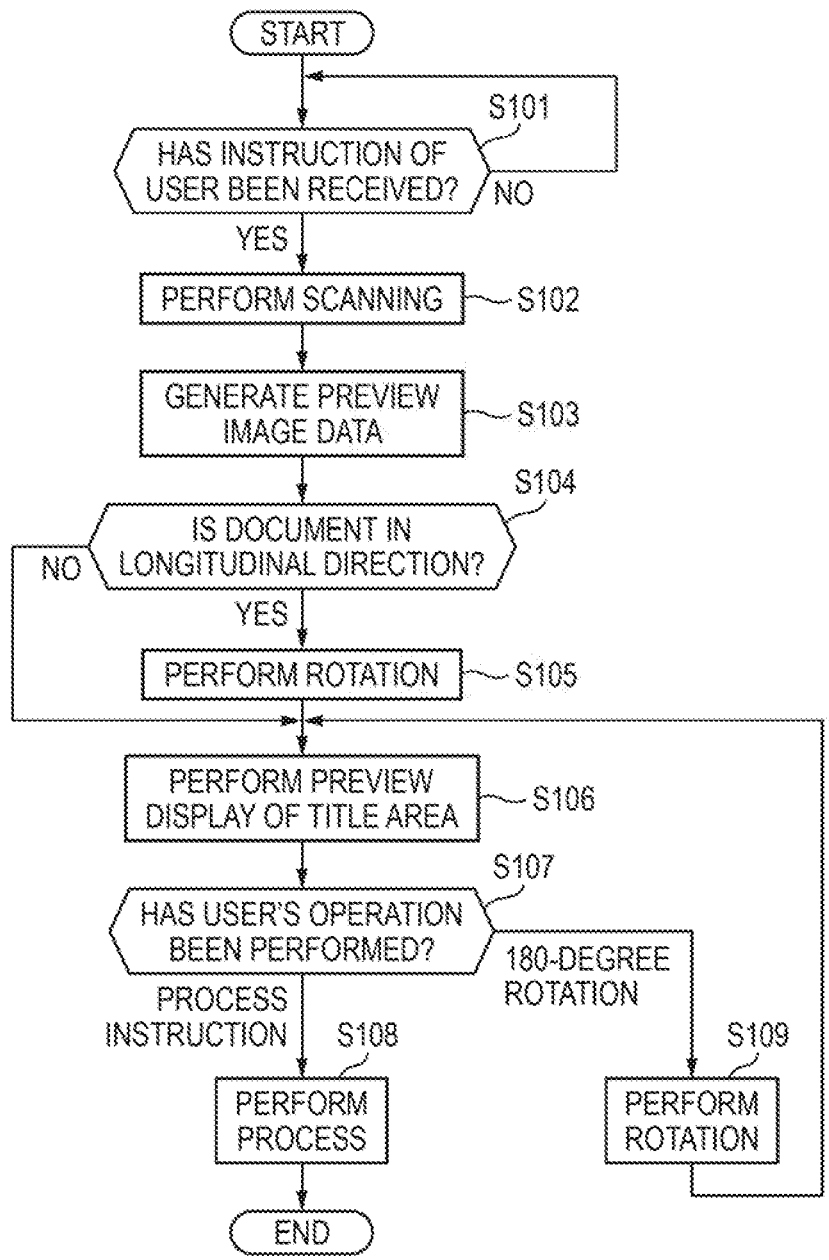
FIG. 5 is a flow chart illustrating the flow of a process of the image processing apparatus.

FIG. 5 is a flow chart illustrating the flow of a process of the image processing apparatus 10. In STEP S101, the processor 152 of the image processing apparatus 10 stands by until the user sets a document on the image processing apparatus 10 and gives an instruction to perform a scanning process. In the case where the UI unit 154 of the image processing apparatus 10 is used to give the scan instruction, the processor 152 of the image processing apparatus 10 displays the menu screen of the image processing apparatus 10 on the UI unit 154, and the user uses the screen displayed on the UI unit 154 to give instructions to perform various processes.

Meanwhile, in the case where the UI unit 354 of the user terminal 30 is used, the processor 152 of the image processing apparatus 10 transmits data representing the menu screen to the user terminal 30, and the processor 352 of the user terminal 30 displays the menu screen on the UI unit 354 according to the data received from the image processing apparatus 10. In this case, the user uses the menu screen displayed on the UI unit 354 to give the instruction to perform the scanning process. In the case where the instruction to perform the scanning process has been given, the user terminal 30 transmits data representing the content of the operation of the user to the image processing apparatus 10, and the processor 152 of the image processing apparatus 10 receives that data from the user terminal 30, thereby detecting that the instruction to perform the scanning process has been given. If detecting that the instruction to perform the scanning process has been given ("YES" in STEP S101), the processor 152 proceeds to the process of STEP S102.

In STEP S102, the processor 152 controls the image reading unit 156 such that the image reading unit performs the scanning process. In other words, the processor 152 controls the image reading unit 156 such that the image reading unit reads an image of the document set on the image processing apparatus 10. Image data representing the read document is generated according to preset setting values. The setting values represent, for example, the resolution and file format of the image data. For example, in the case where the resolution has been set to 600 dpi, and the file format has been set to JPEG (Joint Photographic Experts Group), a file having the JPEG format and having the resolution of 600 dpi is generated.

In STEP S103, the processor 152 generates preview image data from the image data (hereinafter, referred to as actual scan data) representing the document read by the image reading unit 156. In the present exemplary embodiment, in the case where the resolution of the actual scan data is higher than resolution corresponding to a UI panel which is a preview image display destination, the processor 152 lowers the resolution of the actual scan data to acquired resolution, thereby generating preview image data. For example, in the case where the resolution of the actual scan data is 600 dpi, and the resolution of the UI panel is 100 dpi, the processor lowers the resolution of the actual scan data to 100 dpi, thereby generating preview image data. However, in the case where the resolution of the actual scan data is equal to or lower than the resolution of the UI panel, the process of generating preview image data is not performed. In this case, the actual scan data is used as preview image data without changing the actual scan data. In the present exemplary embodiment, the preview image data is image data representing an image of the whole of the read document, and is image data usable in preview display (a function of displaying the image of the document to be stored).

Figure 6:
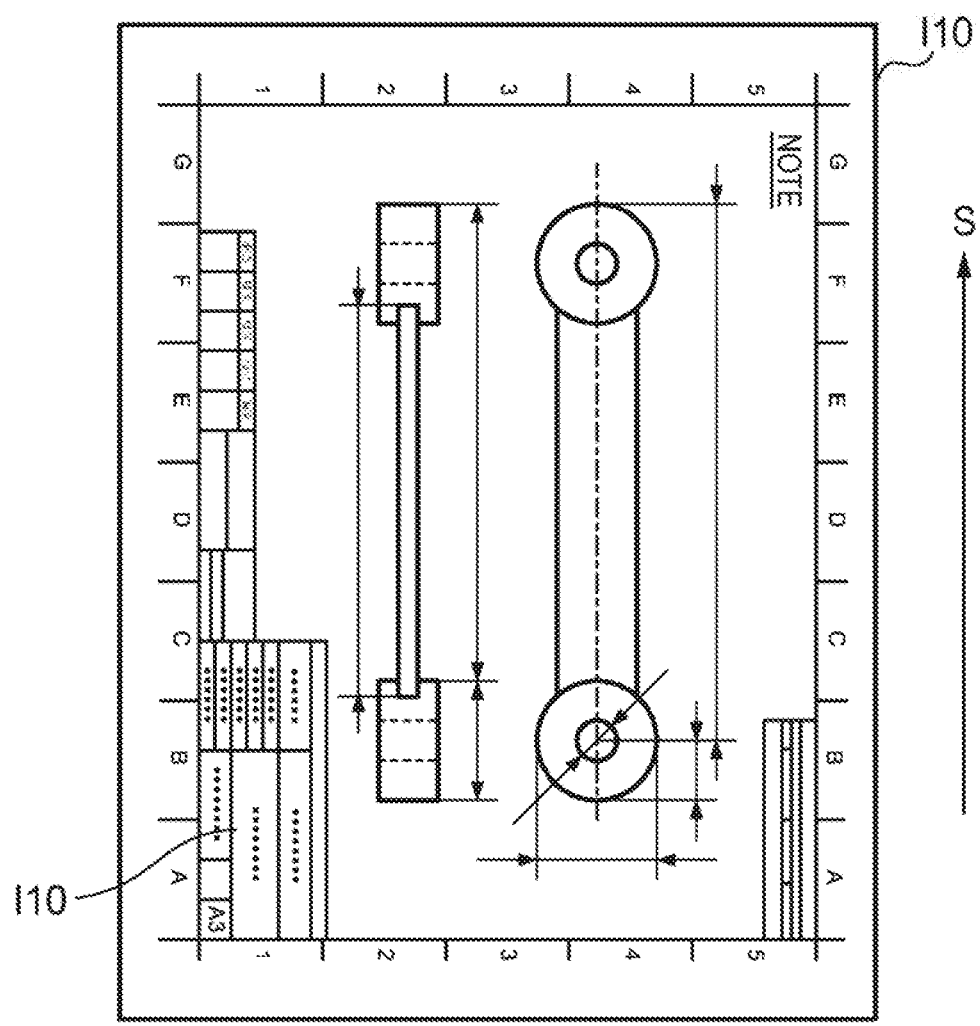
FIG. 6 is a view illustrating a preview image.

FIG. 6 is a view illustrating a preview image represented by preview image data. In the example of FIG. 6, a preview image I10 obtained by scanning a A3 size drawing, is shown. The preview image I10 is an image obtained by reading the document in the longitudinal direction, and having an area (hereinafter, referred to as a title area) I11 having a title and the like written therein and positioned in a lower left area. In the preview image I10, the length of the document in a conveyance direction S is shorter than the length in a direction perpendicular to the conveyance direction S. Therefore, the processor 152 determines that the read document is in the longitudinal direction.

A further description of FIG. 5 will be made. In STEP S104 and STEP S105, in the case where the direction of the preview image represented by the preview image data satisfies a predetermined condition, the processor 152 rotates the preview image by an angle corresponding to the corresponding condition. First, in STEP S104, the processor 152 determines whether the read document is a document being in the longitudinal direction. In the case where it is determined that the document is in the longitudinal direction ("YES" in STEP S104), the processor 152 proceeds to the process of STEP S105. Meanwhile, in the case where it is determined that the document is not in the longitudinal direction ("NO" in STEP S104), the processor 152 skips the process of STEP S105, and proceeds to the process of STEP S106.

In STEP S105, the processor 152 performs a process of rotating the preview image 90 degrees. In the present exemplary embodiment, the processor 152 performs the rotating process on the preview image data for a preview, not on the actual scan data which is an object to be stored.

Figure 7:
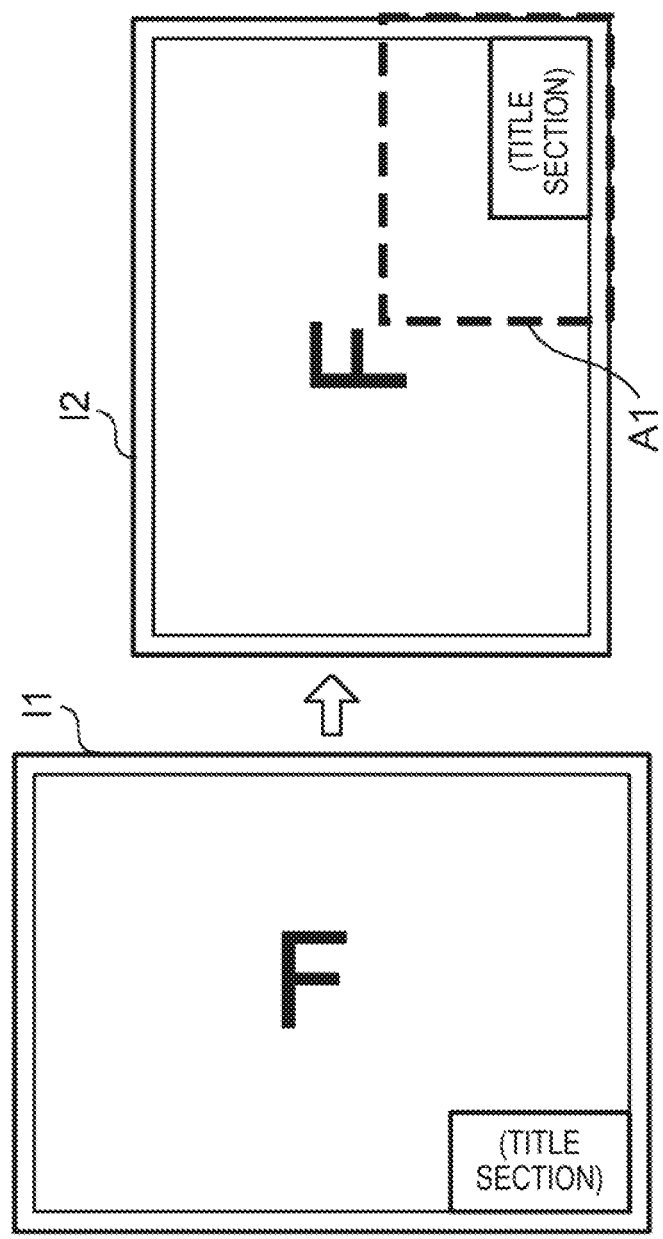
FIG. 7 is a view illustrating a rotated preview image.

FIG. 7 is a view illustrating a preview image obtained by rotation of STEP S105. A preview image I1 is rotated 90 degrees in the left direction so as to become a preview image I2. As shown in FIG. 7, in the present exemplary embodiment, in the case where it is determined that the document is in the longitudinal direction, the process of rotating the image of the document 90 degrees is performed.

A further description of FIG. 5 will be made. In STEP S106, the processor 152 controls the display (the UI unit 154 or the UI unit 354) such that the display displays a partial image which is a part of the image represented by the preview image data and is positioned in a predetermined partial area (hereinafter, referred to as a specific area), as an upright image. In the present exemplary embodiment, a thumbnail image of the read document is not displayed as a preview image, and a part of the read document is displayed on a scale similar to that of the read document. In the present exemplary embodiment, a lower right area (an area A1) of the document is specified as a specific area which is a default, and a partial image including the specific area is displayed on a scale similar to that of the read document. The position of the specific area is relatively determined in the direction in which the preview image is displayed, and is not absolutely determined with respect to the image.

Figure 8:
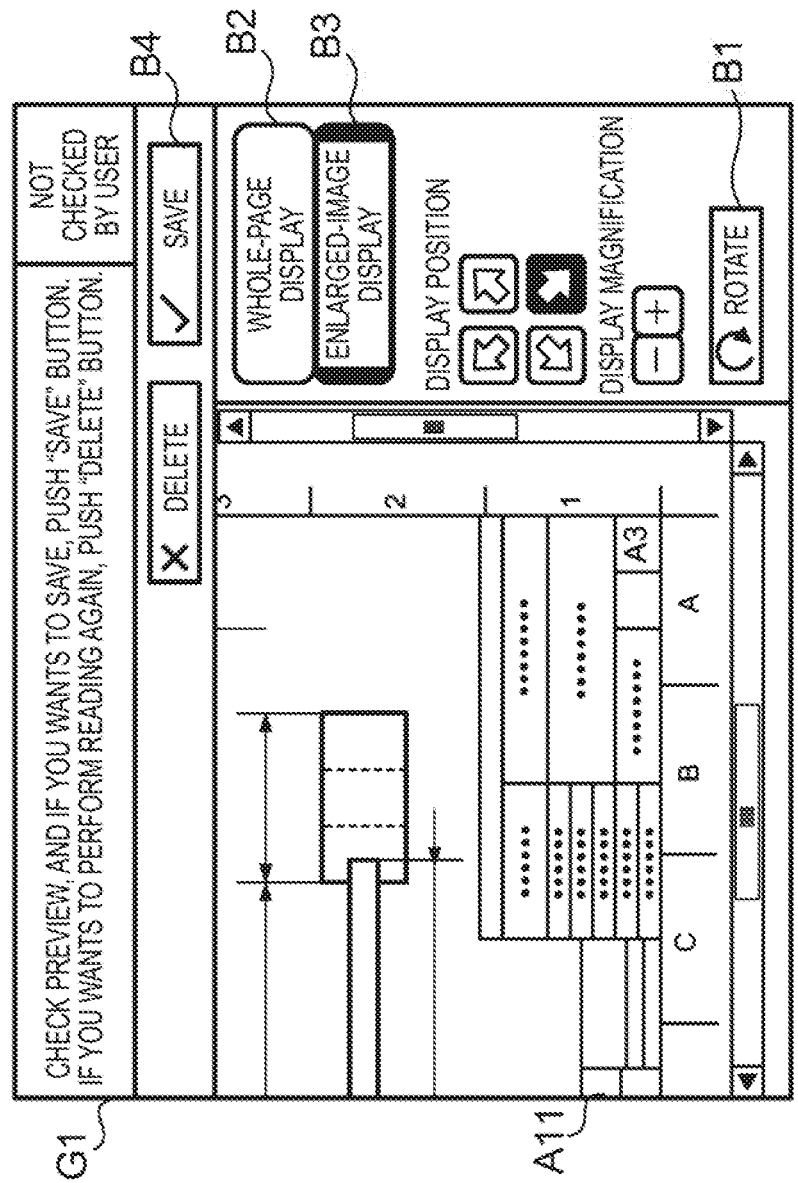
FIG. 8 is a view illustrating a preview screen.

FIG. 8 is a view illustrating a preview screen which is displayed on a display panel of the display. In FIG. 8, a screen G1 includes display components such as a preview image area A11, a button B1 for rotating a preview image, a "WHOLE-PAGE DISPLAY" button B2, an "ENLARGED-IMAGE DISPLAY" button B3, and a "SAVE" button B4. In the state where the screen shown in FIG. 8 is displayed, the processor 152 stands by until the user performs an operation. If a user's operation is performed, the processor 152 proceeds to the process of STEP S107 of FIG. 5.

A further description of FIG. 5 will be made. In the case where it is determined in STEP S107 that the user has pushed the "SAVE" button to give an instruction to perform the process ("PROCESS INSTRUCTION" in STEP S107), the processor 152 proceeds to the process of STEP S108. Meanwhile, in the case where the user has performed an operation to give an instruction to rotate the preview image ("180-DEGREE ROTATION" in STEP S107), the processor 152 proceeds to the process of STEP S109.

In STEP S108, the processor 152 performs a process of storing the actual scan data generated in STEP S102 in the predetermined storage. If finishing the process of STEP S108, the processor 152 finishes the procedure of the scanning process shown in FIG. 5.

In STEP S109, the processor 152 specifies a partial image which is a part of an image obtained by rotating the image represented by the preview image data generated in STEP S103 180 degrees and is positioned in the predetermined lower right area (the specific area), and controls the display (the UI unit 154 or the UI unit 354) such that the display displays the specified partial image.

Figure 9:
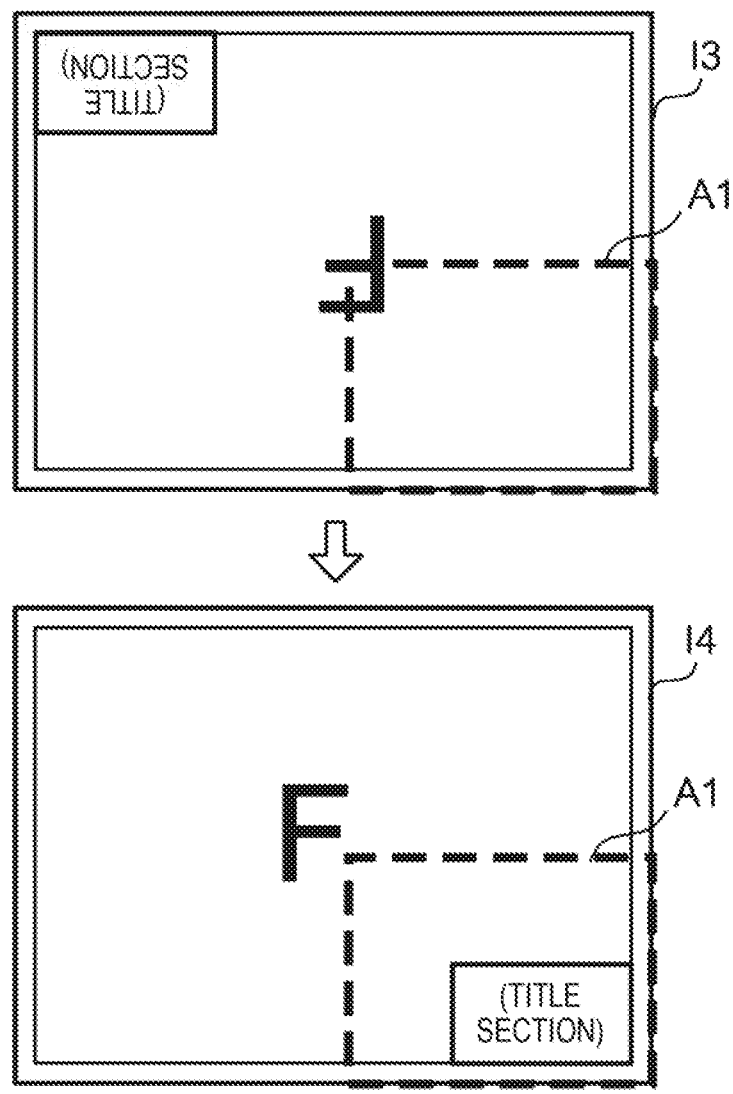
FIG. 9 is a view illustrating a rotated preview image.

FIG. 9 is a view illustrating a preview image obtained by rotation of STEP S109. In this example, a preview image I3 is rotated 180 degrees so as to become a preview image I4. In the present exemplary embodiment, the image of a specific area A1 is not rotated, and the whole of the preview image I3 is rotated 180 degrees, whereby a partial image which is a part of the rotated preview image and is positioned in the specific area A1 positioned on the lower right side becomes a new partial image to be displayed on the preview screen.

A further description of FIG. 5 will be made. If finishing the process of STEP S109, the processor 152 returns to the process of STEP S106, and performs the process of displaying the preview screen.

Figure 10:
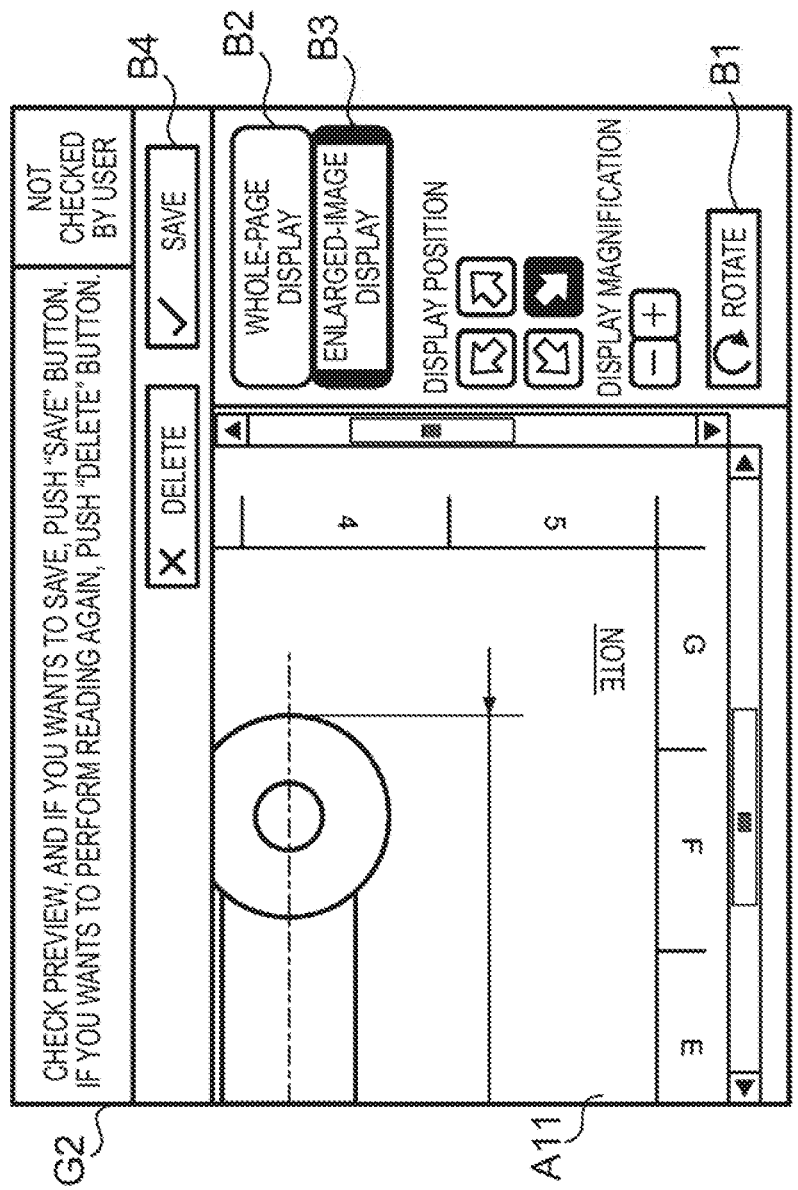
FIG. 10 is a view illustrating a preview screen.

FIG. 10 is a view illustrating a preview screen G2 which is displayed before a "ROTATE" button is pushed in STEP S107. In the preview screen G2 of FIG. 10, if the "ROTATE" button B1 is pushed, the preview image is rotated 180 degrees. As a result, a preview screen G1 shown in FIG. 8 is displayed on the display. At this time, as described above, an image obtained by the partial image shown in the preview screen G2 180 degrees is not displayed, and the preview image of the whole of the document is rotated 180 degrees, whereby the partial image is updated with another partial image.

By the way, in the case of reading a large-sized document such as a drawing, even if a preview image of the whole of the read document is displayed on a small screen, it may be difficult for the user to check the content of the read document. In contrast, in the present exemplary embodiment, since the image including the specific area having the title and the like written therein is displayed on a scale similar to that of the read document, it is easy for the user to check the title and the like.

Figure 13:
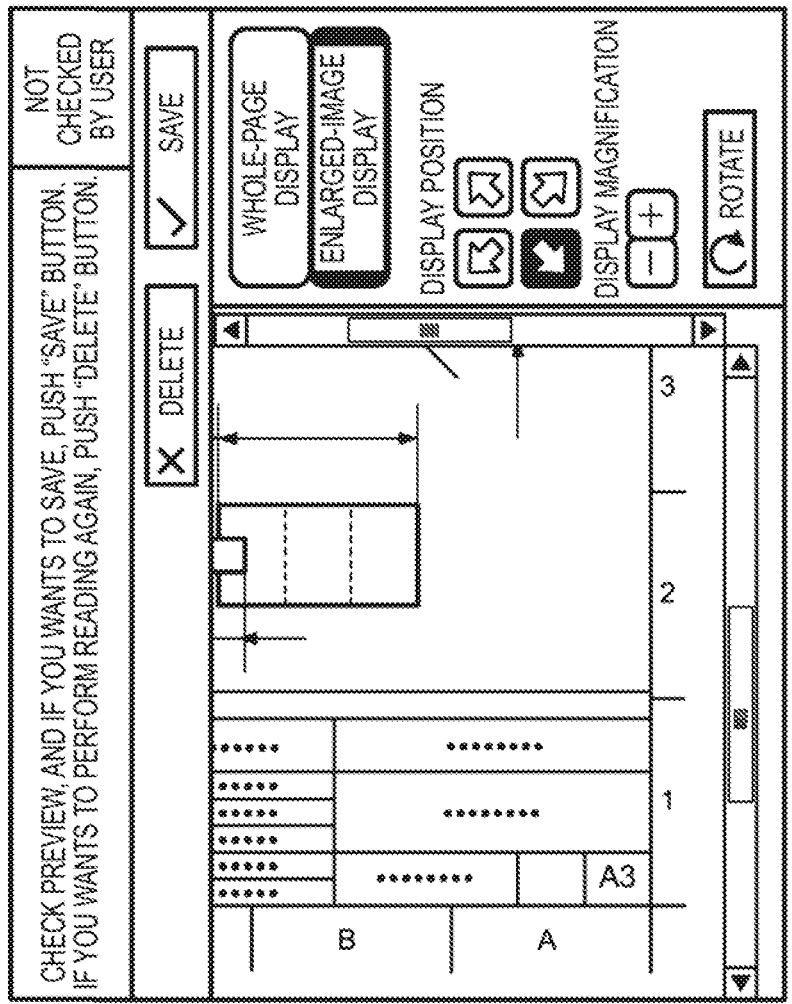
FIG. 13 is a view illustrating a preview screen according to an apparatus of the related art.
Figure 14:
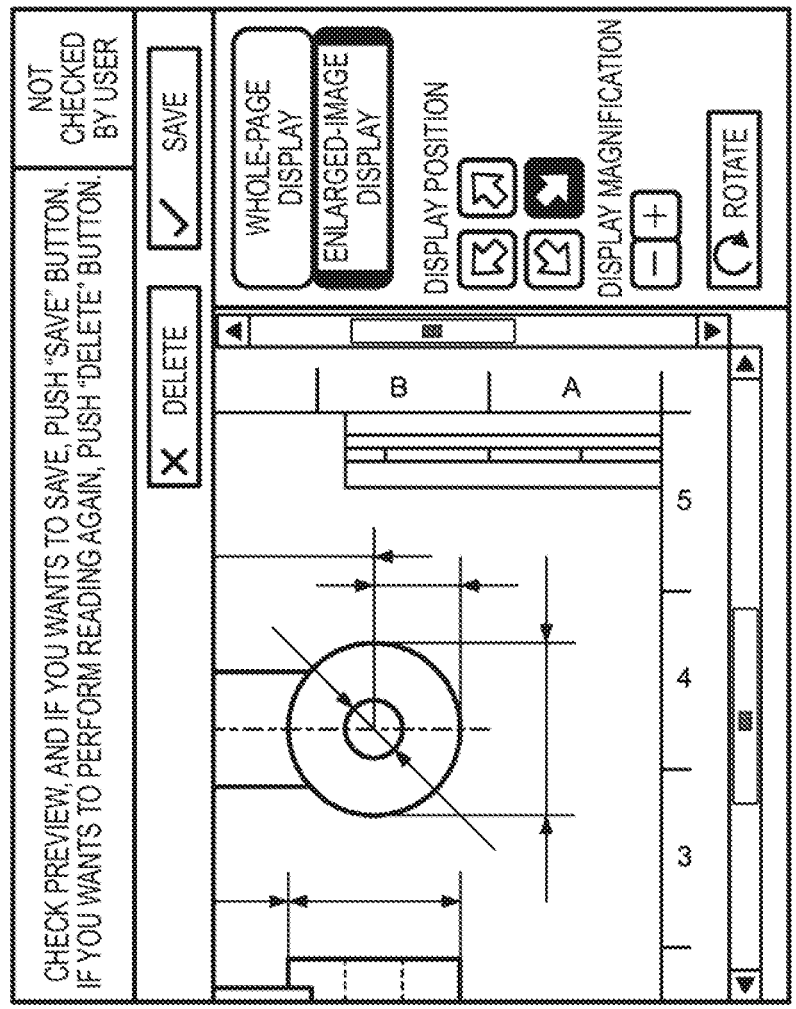
FIG. 14 is a view illustrating another preview screen according to the apparatus of the related art.

Also, for example, in the case of a document having a large size called A0 size, the document is conveyed in the longitudinal direction. In this case, since the read document is in the longitudinal direction, if preview display is performed in the direction of the document, as shown in FIG. 13 and FIG. 14, since the title section is also displayed in the longitudinal direction, it is difficult to check component names, part numbers, and the like written in the title section. In contrast, in the present exemplary embodiment in the case where the direction of the preview image is inverted in the vertical direction as shown in FIG. 10, a process of determining the upper side and lower side of the preview image is performed. If the "ROTATE" button B1 of FIG. 10 is pushed, the preview image is rotated 180 degrees, and a lower right area of the rotated preview image is displayed on the preview screen. As described above, in the present exemplary embodiment, if the "ROTATE" button B1 is pushed, the partial image displayed in the preview screen is not rotated 180 degrees, and the display of the preview screen is switched to a partial image which is a part of an image obtained by rotating the image of the whole of the document 180 degrees and is positioned in the specific area positioned on the lower right side. Therefore, the user can easily check information such as the title only by pushing the "ROTATE" button B1.

Also, in the present exemplary embodiment, the rotating process is performed on the preview image data for a preview, not on the actual scan data which is an object to be stored. Since the data amount of the preview image data is smaller than that of the actual scan data, the processing load is less than that in the case where the process is performed on the actual scan data.

[3] Modifications

The above-described exemplary embodiment is merely an example of the present invention, and may be modified as follows. Also, the above-described exemplary embodiment and the following individual modifications may be combined if necessary.

(1) In the above-described exemplary embodiment, the processor 152 may perform image analysis on the preview image data, and specify a rectangular area satisfying the predetermined condition according to the analysis result, and use the specified rectangular area as the specific area.

Figure 11:
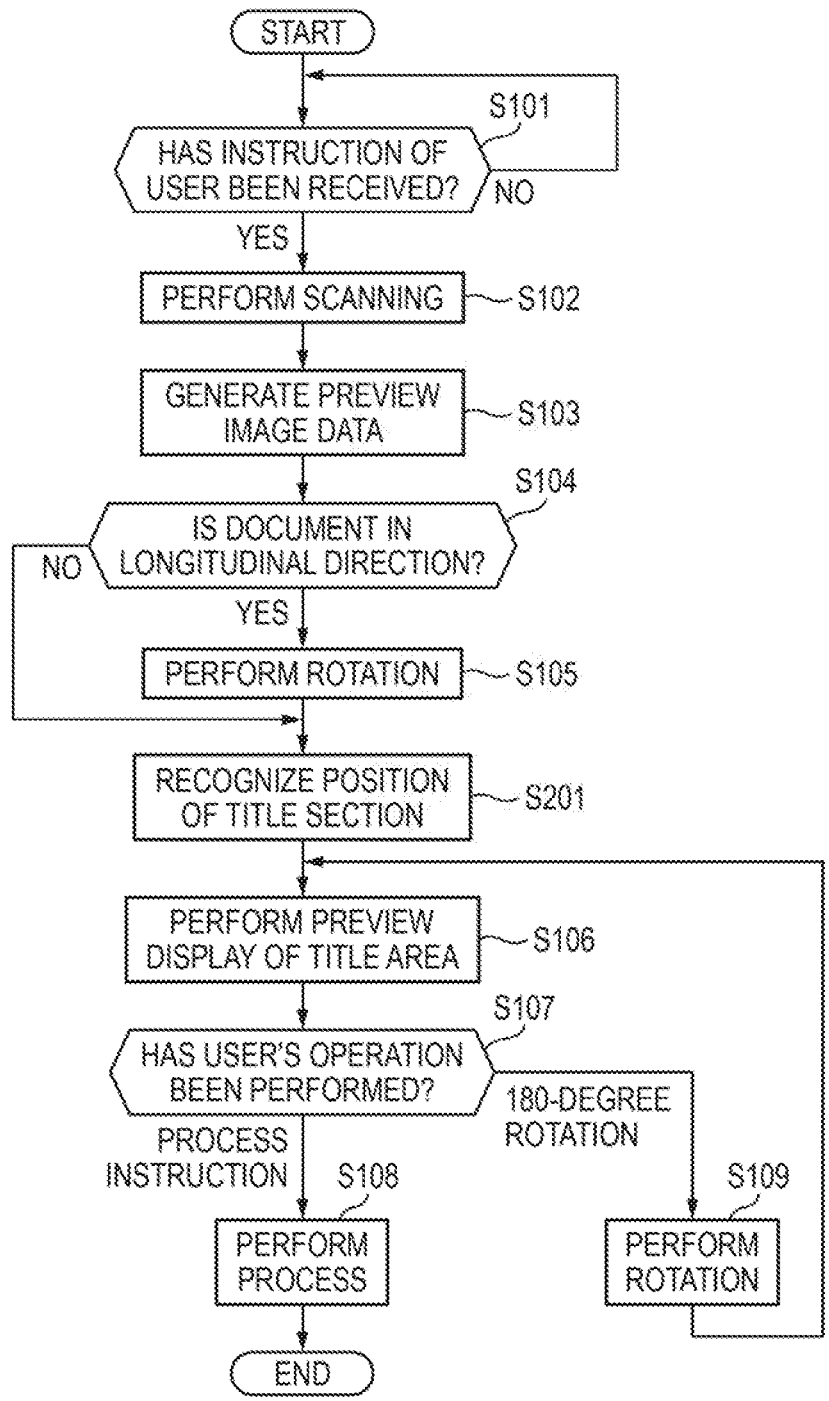
FIG. 11 is a flow chart illustrating the flow of a process of the image processing apparatus.

FIG. 11 is a flow chart illustrating a process of the image processing apparatus 10 according to the above-mentioned mode. The process shown in FIG. 11 is different from the process shown in FIG. 5 in that the process of STEP S201 is performed after the process of STEP S105. In STEP S201, the processor 152 analyzes the preview image data (or the image data) of the read document, and recognizes the position of the title section. In this mode, detection on the title section may be performed by detecting an area including one or more character strings surrounded by a rectangular frame. Also, in the case where two or more rectangular areas are detected, a rectangular area having the largest size may be specified as the area of the title section. The processor 152 sets the specified rectangular area as the specific area, and controls the display such that the display displays a partial image positioned in the specific area.

(2) Also, in the above-described exemplary embodiment, the processor 152 may recognize the position of the title section, and determine the direction of rotation. For example, in the case where the specified rectangular area is positioned on the upper left side of the preview image, the processor 152 rotates the preview image 180 degrees such that the specified rectangular area is positioned at a lower right position. As described above, the processor 152 may perform image analysis on the preview image data, and specify a rectangular area satisfying the predetermined condition, according to the analysis result, and rotate the preview image data in such a direction that at least a pan of the specified rectangular area is positioned at a predetermined position (the specified area) (such a direction that at least a part of the rectangular area overlap the specific area), and control the display such that the display displays the partial image which is a part of the rotated preview image and is positioned in the specific area.

(3) In the above-described exemplary embodiment, the lower right area of the preview image is set as the specific area. However, the position of the specific area is not limited to the above-described position. For example, an area positioned on the upper left side of the preview image may be set as the specific area.

Figure 12:
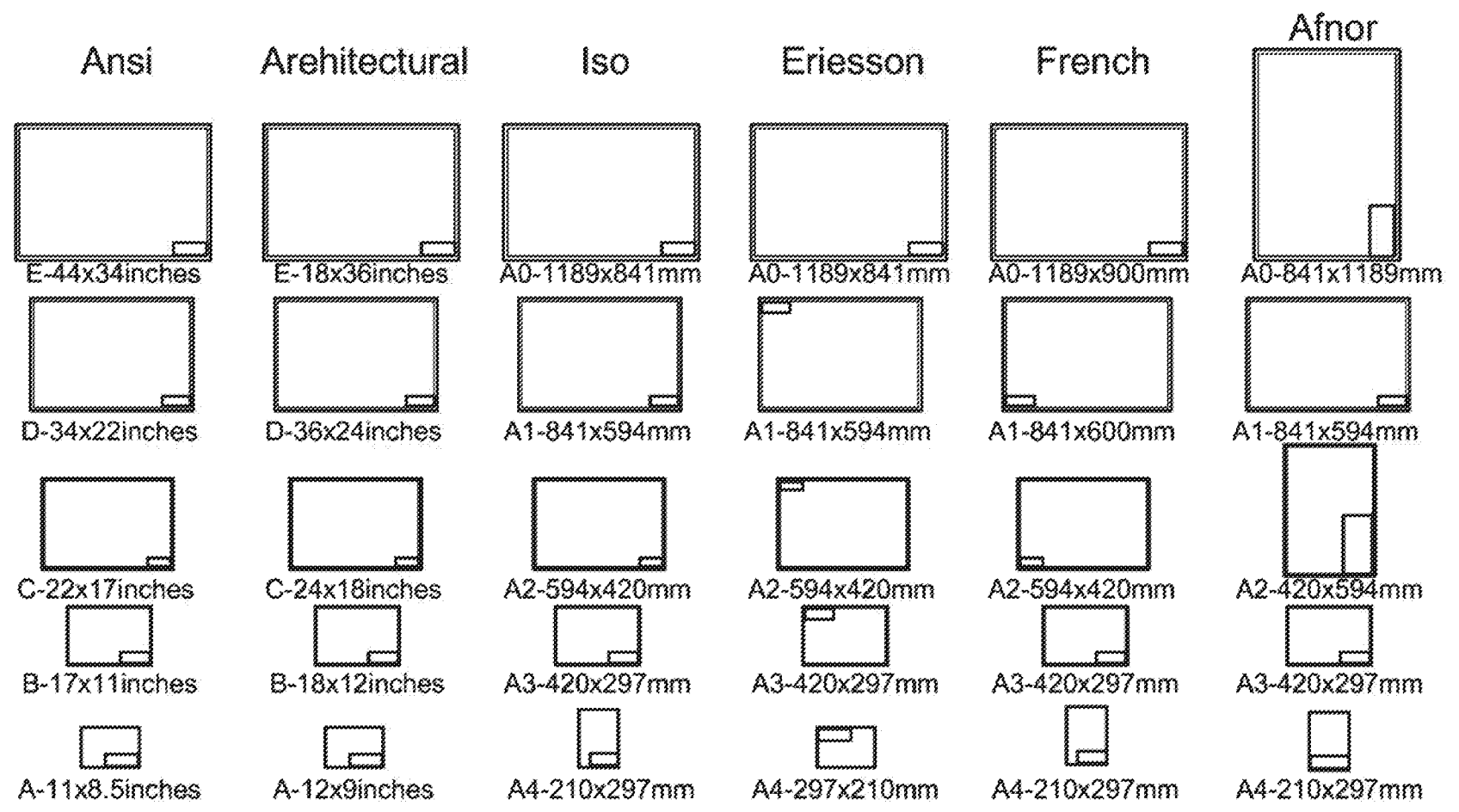

(4) Also, in the above-described exemplary embodiment, the processor 152 may switch the position of the specific area for a preview to be displayed, depending on at least one of the size and standard of each read document. As shown in FIG. 12, the positions of title sections depend on the types and sizes of the standards of documents (for example, ISO, French, and the like). For example, in the standards of ISO, title sections are positioned on the lower rear side; whereas in the case of French Standards, with respect to some sizes, title sections are positioned on the lower left side. For this reason, a table defining the correspondence relation between the sizes and/or standard types (attributes) of documents and the positions (coordinates) of title sections may be stored in the memory 151 (a memory) in advance, and the processor 152 may specify at least one of the size and standard of a read document as the attribute of the document, with reference to the stored table, and specify a position corresponding to the specified attribute as the position of a title section.

The user may select the type of the standard of a document by operating the UI unit 154, or the processor 152 may perform image analysis on the preview image data, and perform a process such as pattern mapping, thereby specifying the type of the standard of a document.

(5) In the above-described exemplary embodiment, in STEP S105 of FIG. 5, the processor 152 performs the process of rotating the preview image 90 degrees in the left direction. However, the direction and angle of rotation of the preview image are not limited to the direction and the angle shown in the above-described exemplary embodiment. For example, the processor 152 may perform a process of rotating the preview image 90 degrees in the right direction, not in the left direction.

(6) In the above-described exemplary embodiment, the programs which are executable by the processor 152 of the image processing apparatus 10 may be downloaded via the communication line such as the Internet. Also, these programs may be recorded on a computer-readable recording medium such as a magnetic recording medium (like a magnetic tape or a magnetic disk), an optical recording medium (like an optical disk), a magneto-optical recording medium, or a semiconductor memory to be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one processor configured to generate preview image data representing a whole image of a document read by an image reader, the preview image data having a data amount that is smaller than a data amount of actual scan data of the document read by the image reader;
the at least one processor further being configured to control a display such that the display displays a partial image which is only a part of the whole image represented by the preview image data and which is positioned in a specific area of the whole image being a predetermined partial area that is part of the document, as an upright image and on a scale similar to that of the document;
wherein the at least one processor is configured to perform image analysis on the preview image data, and is configured to specify a rectangular area satisfying a predetermined condition, according to a result of the image analysis; and
the at least one processor is configured to rotate the preview image data in such a direction that at least a part of the specified rectangular area overlaps the specific area, and the at least one processor is configured to control the display such that the display displays a partial image which is a part of the rotated preview image data and is positioned in the specific area.

2. The image processing apparatus according to claim 1, wherein:
in the case where an image rotation instruction is given, the at least one processor is configured to specify a partial image which is an image obtained by rotating the image represented by the generated preview image data, 180 degrees, and is positioned in the specific area, and the at least one processor is configured to control the display such that the display displays the specified partial image.

3. The image processing apparatus according to claim 1, wherein:
in the case where a direction of the image represented by the preview image data satisfies a predetermined condition, the at least one processor is configured to rotate the corresponding image by an angle corresponding to the predetermined condition, and the at least one processor is configured to control the display such that the display displays a partial image which is a part of the rotated image and is positioned in the specific area.

4. The image processing apparatus according to claim 2, wherein:
in the case where a direction of the image represented by the preview image data satisfies a predetermined condition, the at least one processor is configured to rotate the corresponding image by an angle corresponding to the predetermined condition, and the at least one processor is configured to control the display such that the display displays a partial image which is a part of the rotated image and is positioned in the specific area.

5. The image processing apparatus according to claim 1, wherein
the at least one processor is configured to specify at least one of a size and standard of the read document as an attribute of the document,
wherein, with reference to a memory retaining a correspondence relation between the attribute and coordinates relative to the specific area, the at least one processor is configured to set an area having the coordinates corresponding to the specified attribute, as the specific area.

6. The image processing apparatus according to claim 2, wherein
the at least one processor is configured to specify at least one of a size and standard of the read document as an attribute of the document,
wherein, with reference to a memory retaining a correspondence relation between the attribute and coordinates relative to the specific area, the at least one processor is configured to set an area having the coordinates corresponding to the specified attribute, as the specific area.

7. The image processing apparatus according to claim 3, wherein
the at least one processor is configured to specify at least one of a size and standard of the read document as an attribute of the document,
wherein, with reference to a memory retaining a correspondence relation between the attribute and coordinates relative to the specific area, the at least one processor is configured to set an area having the coordinates corresponding to the specified attribute, as the specific area.

8. The image processing apparatus according to claim 4, wherein
the at least one processor is configured to specify at least one of a size and standard of the read document as an attribute of the document,
wherein, with reference to a memory retaining a correspondence relation between the attribute and coordinates relative to the specific area, the at least one processor is configured to set an area having the coordinates corresponding to the specified attribute, as the specific area.

9. The image processing apparatus according to claim 1, wherein
the at least one processor is configured to perform image analysis on the preview image data, and is configured to specify a rectangular area satisfying a predetermined condition, according to a result of the image analysis,
wherein the at least one processor is configured to set the specified rectangular area as the specific area.

10. The image processing apparatus according to claim 2, wherein
the at least one processor is configured to perform image analysis on the preview image data, and is configured to specify a rectangular area satisfying a predetermined condition, according to a result of the image analysis,
wherein the at least one processor is configured to set the specified rectangular area as the specific area.

11. The image processing apparatus according to claim 3, wherein
the at least one processor is configured to perform image analysis on the preview image data, and is configured to specify a rectangular area satisfying a predetermined condition, according to a result of the image analysis,
wherein the at least one processor is configured to set the specified rectangular area as the specific area.

12. The image processing apparatus according to claim 4, wherein
the at least one processor is configured to perform image analysis on the preview image data, and is configured to specify a rectangular area satisfying a predetermined condition, according to a result of the image analysis,
wherein the at least one processor is configured to set the specified rectangular area as the specific area.

13. The image processing apparatus according to claim 9, wherein:
the rectangular area is an area having one or more character strings including a character string representing a title and surrounded by a rectangular frame.

14. The image processing apparatus according to claim 1, wherein:
the rectangular area is an area having one or more character strings including a character string representing a title and surrounded by a rectangular frame.

15. A non-transitory computer readable medium storing a program causing a computer to execute a process for:
generating preview image data representing a whole image of a read document, the preview image data having a data amount that is smaller than a data amount of actual scan data of the read document;
controlling a display such that the display displays a partial image which is only a part of the whole image represented by the preview image data and which is positioned in a specific area of the whole image being a predetermined partial area that is part of the document, as an upright image and on a scale similar to that of the document;
performing image analysis on the preview image data, and specifying a rectangular area satisfying a predetermined condition, according to a result of the image analysis; and
rotating the preview image data in such a direction that at least a part of the specified rectangular area overlaps the specific area, and controlling the display such that the display displays a partial image which is a part of the rotated preview image data and is positioned in the specific area.

* * * * *